US008826185B2

(12) United States Patent
Ikegami

(10) Patent No.: US 8,826,185 B2
(45) Date of Patent: Sep. 2, 2014

(54) GUI EVALUATION SYSTEM, GUI EVALUATION METHOD, AND GUI EVALUATION PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 671 days.

(21) Appl. No.: 12/998,224

(22) PCT Filed: Aug. 7, 2009

(86) PCT No.: PCT/JP2009/003830
§ 371 (c)(1),
(2), (4) Date: Mar. 28, 2011

(87) PCT Pub. No.: WO2010/035392
PCT Pub. Date: Apr. 1, 2010

(65) Prior Publication Data
US 2011/0179365 A1     Jul. 21, 2011

(30) Foreign Application Priority Data

Sep. 29, 2008   (JP) ................................ 2008-251812

(51) Int. Cl.
*G06F 3/00*     (2006.01)
*G06F 11/36*     (2006.01)
*G06F 9/44*     (2006.01)
(52) U.S. Cl.
CPC .......... *G06F 11/3668* (2013.01); *G06F 9/4443* (2013.01); *G06F 8/38* (2013.01)
USPC .......................................... 715/853; 715/864
(58) Field of Classification Search
USPC ....................................................... 715/853
See application file for complete search history.

(56) References Cited

U.S. PATENT DOCUMENTS 6,237,006 B1 *   5/2001   Weinberg et al. ............. 707/797
6,859,810 B2 *   2/2005   Andrei et al. ......................... 1/1
(Continued)

FOREIGN PATENT DOCUMENTS

JP    8-241191 (A)    9/1996
JP    11-85497    3/1999
(Continued)

OTHER PUBLICATIONS

Written Opinion of the International Searching Authority dated Oct. 20, 2009, with English translation.
(Continued)

*Primary Examiner* — Ryan Pitaro
(74) *Attorney, Agent, or Firm* — McGinn IP Law Group, PLLC

(57) ABSTRACT

The uniqueness of the screen name for each screen of a system to be evaluated is evaluated simply and with high precision. The GUI evaluation system includes GUI information acquisition means for acquiring a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquiring information about components used in a contents display area where the contents of the lowest-level screen name existing in the evaluation target screen are displayed as a title; and screen name evaluation means for evaluating the uniqueness of screen names in the evaluation target system in accordance with the information about the level-specific screen name in each evaluation target screen, the level-specific screen name being acquired by the GUI information acquisition means, and in accordance with the information about the components included in the contents display area of each evaluation target screen.

20 Claims, 13 Drawing Sheets

(56) References Cited

U.S. PATENT DOCUMENTS

| | | | |
|---|---|---|---|
| 6,915,307 B1* | 7/2005 | Mattis et al. | 1/1 |
| 7,272,787 B2* | 9/2007 | Nakamura et al. | 715/234 |
| 7,325,045 B1* | 1/2008 | Manber et al. | 709/219 |
| 7,421,458 B1* | 9/2008 | Taylor et al. | 1/1 |
| 7,778,963 B2* | 8/2010 | Novik et al. | 707/610 |
| 8,055,626 B1* | 11/2011 | Jain | 707/655 |
| 8,429,362 B1* | 4/2013 | Natanzon et al. | 711/162 |
| 2002/0087534 A1* | 7/2002 | Blackman et al. | 707/4 |
| 2003/0084429 A1* | 5/2003 | Schaefer | 717/125 |
| 2004/0030683 A1* | 2/2004 | Evans et al. | 707/3 |
| 2005/0229134 A1* | 10/2005 | Hetzel et al. | 716/10 |
| 2007/0208703 A1* | 9/2007 | Shi et al. | 707/3 |
| 2007/0240041 A1* | 10/2007 | Pearson | 715/522 |
| 2008/0183720 A1* | 7/2008 | Brown et al. | 707/10 |
| 2009/0063538 A1* | 3/2009 | Chitrapura et al. | 707/102 |
| 2009/0273597 A1* | 11/2009 | Chatamballi et al. | 345/418 |
| 2012/0117052 A1* | 5/2012 | Zhang et al. | 707/709 |

FOREIGN PATENT DOCUMENTS

| | | |
|---|---|---|
| JP | 11-85497 (A) | 3/1999 |
| JP | 2004-110267 (A) | 4/2004 |
| JP | 2004-234402 (A) | 8/2004 |
| JP | 2004-355157 | 12/2004 |
| JP | 2004-355157 (A) | 12/2004 |

OTHER PUBLICATIONS

Hidehiko Okada et al. Proposal of a Tool [GUI Tester II] for Evaluating Consistency in GUI Design, Study Report of Information Processing Society of Japan, Jul. 12, 1997, vol. 97, No. 63, pp. 7-12.

Hidehiko Okada et al., "GUI Sekkei no Ikkansei o Hyoka suru Tool 'Gui Tester II' no Teian", IPSJ SIG Notes, Jul. 12, 1997, vol. 97, No. 63, pp. 7-12.

* cited by examiner

FIG. 4

WINDOW A-1

```
BUSINESS SYSTEM A                    ~A11
REQUEST FOR BUSINESS TRIP     A12
    ITEM 1: [        ]
    ITEM 2: [            ]
    ITEM 3: [       ▼]
    ITEM 4: [PLEASE DESCRIBE REASONS
                                    ]
                         [ BACK ] [ NEXT ]   ~A13
```

FIG. 5

| WINDOW A-1 | |
|---|---|
| LEVEL | DATA |
| Lv0 (WINDOW TITLE) | BUSINESS SYSTEM A |
| Lv1 | REQUEST FOR BUSINESS TRIP |

FIG. 6

| WINDOW A-1 | | |
|---|---|---|
| TYPE | DATA | OPERABILITY |
| TEXT | "ITEM 1:" | -- |
| TEXT BOX | NULL | OPERABLE |
| TEXT | "ITEM 2:" | -- |
| TEXT BOX | NULL | OPERABLE |
| TEXT | "ITEM 3:" | -- |
| LIST BOX | NULL | OPERABLE |
| TEXT | "ITEM 4:" | -- |
| TEXT BOX | "PLEASE DESCRIBE REASONS" | OPERABLE |
| OPERATION BUTTON | "BACK" | OPERABLE |
| OPERATION BUTTON | "NEXT" | OPERABLE |

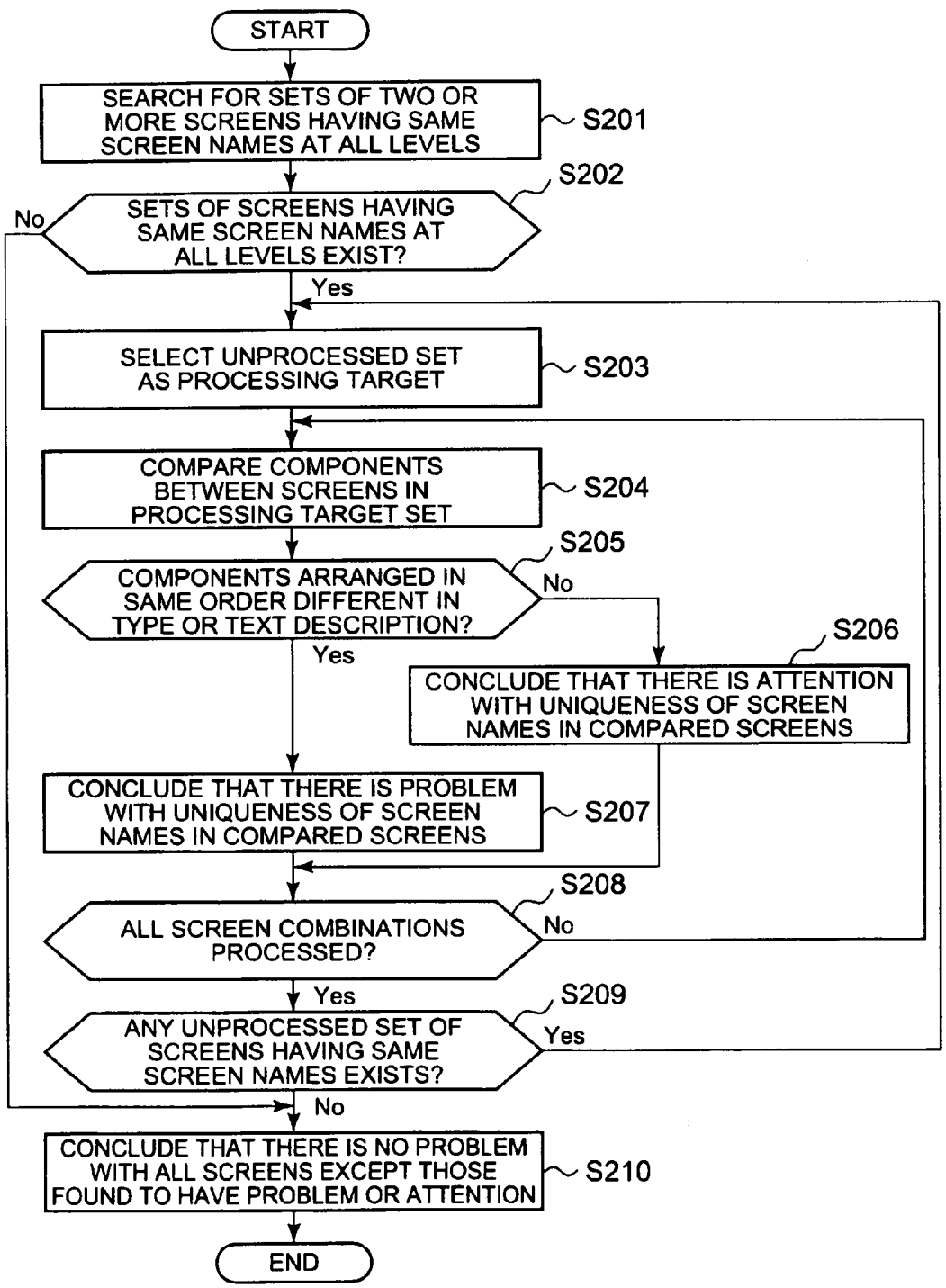

FIG. 9

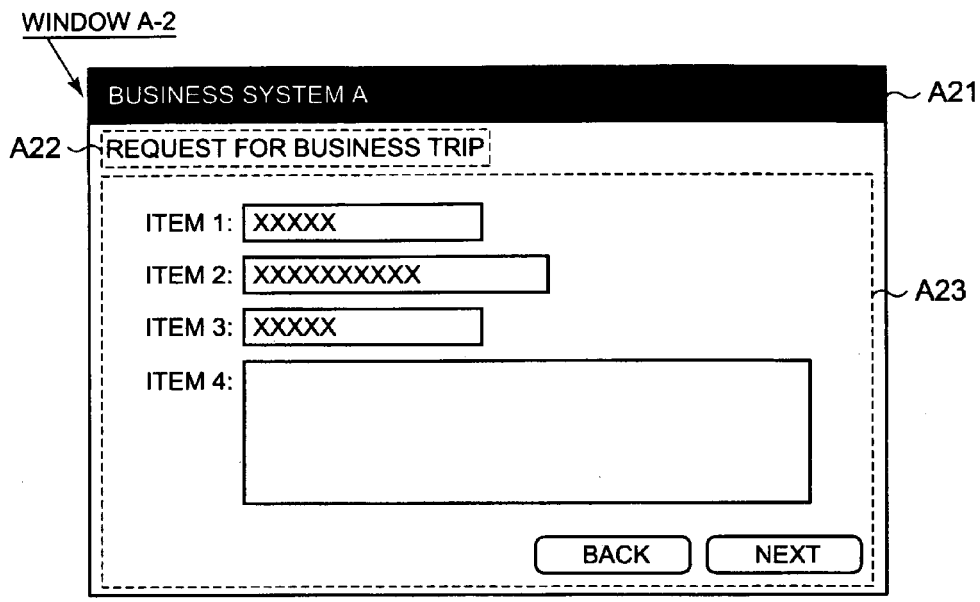

FIG. 10

| WINDOW A-2 | | |
|---|---|---|
| TYPE | DATA | OPERABILITY |
| TEXT | "ITEM 1:" | -- |
| TEXT BOX | "XXXXX" | OPERABLE |
| TEXT | "ITEM 2:" | -- |
| TEXT BOX | "XXXXXXXXX" | OPERABLE |
| TEXT | "ITEM 3:" | -- |
| TEXT BOX | "XXXXX" | OPERABLE |
| TEXT | "ITEM 4:" | -- |
| TEXT BOX | NULL | OPERABLE |
| OPERATION BUTTON | "BACK" | OPERABLE |
| OPERATION BUTTON | "NEXT" | OPERABLE |

FIG. 11

| SCREEN NAME | | UNIQUENESS JUDGMENT |
|---|---|---|
| Lv0 | Lv1 | |
| BUSINESS SYSTEM A | REQUEST FOR BUSINESS TRIP | × (PROBLEM): WINDOWS A-1 AND A-2 |

FIG. 14

| WINDOW B-1 | |
|---|---|
| LEVEL | DATA |
| Lv0 (WINDOW TITLE) | BUSINESS SYSTEM B |
| Lv1 | REQUEST FOR BUSINESS TRIP (INPUT) |

| WINDOW B-2 | |
|---|---|
| LEVEL | DATA |
| Lv0 (WINDOW TITLE) | BUSINESS SYSTEM B |
| Lv1 | REQUEST FOR BUSINESS TRIP (CONFIRMATION) |

FIG. 15

| SCREEN NAME | | UNIQUENESS JUDGMENT |
|---|---|---|
| Lv0 | Lv1 | |
| BUSINESS SYSTEM B | REQUEST FOR BUSINESS TRIP (INPUT) | O (NO PROBLEM): WINDOW B-1 |
| BUSINESS SYSTEM B | REQUEST FOR BUSINESS TRIP (CONFIRMATION) | O (NO PROBLEM): WINDOW B-2 |

FIG. 16

WINDOW C-1

BUSINESS SYSTEM C — C11

MENU
XXXX
XXXXXX

XXXX
XXXXXX
XXXX

C12

REQUEST FOR BUSINESS TRIP > RESULT CONFIRMATION — C13
— C131

● 2008/04/01 - 2008/04/03
○ 2008/04/20 - 2008/04/20
○ 2008/06/01 - 2008/06/03
○ 2008/07/15 - 2008/07/16

— C132

SELECT

BACK

FIG. 17

WINDOW C-2

| BUSINESS SYSTEM C | — C21 |

MENU
XXXX
XXXXX

XXXX
XXXXX
XXXX

REQUEST FOR BUSINESS TRIP > RESULT CONFIRMATION — C22

REGISTRATION INFORMATION 1 | REGISTRATION INFORMATION 2 — C23

ITEM 1: 2008/04/01 - 2008/04/03
ITEM 2: XXXXX
ITEM 3: XXXXXXXXX
ITEM 4: XXXX

BACK

WINDOW C-3

| BUSINESS SYSTEM C | — C31 |

MENU
XXXX
XXXXX

XXXX
XXXXX
XXXX

REQUEST FOR BUSINESS TRIP > RESULT CONFIRMATION — C32

REGISTRATION INFORMATION 1 | REGISTRATION INFORMATION 2 — C33

ITEM 1: 2008/04/20 - 2008/04/20
ITEM 2: XXXXX
ITEM 3: XXXXXXX
ITEM 4: XXXXXXXXXXXXXXX

BACK

— C34

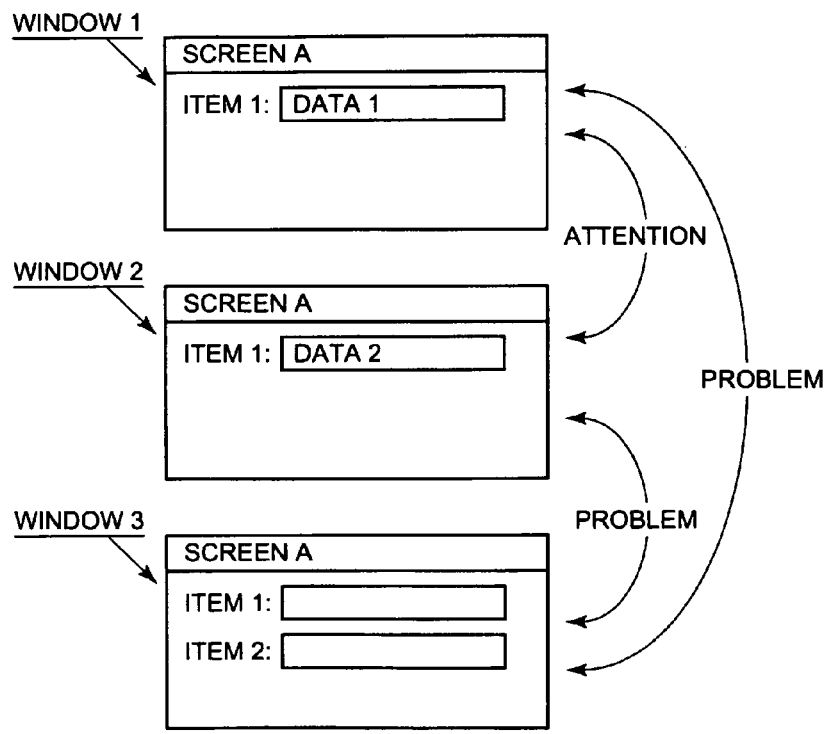

FIG. 25

| WINDOW D-1 | | |
|---|---|---|
| TYPE | DATA | OPERABILITY |
| TEXT | "! ITEM 4 IS NOT DESIGNATED." | -- |
| TEXT | "ITEM 1: 2008/04/20 - 2008/04/20" | -- |
| TEXT | "ITEM 2: aaaaaaaa" | -- |
| TEXT | "ITEM 3: bbbb" | -- |
| TEXT | "ITEM 4:" | -- |
| OPERATION BUTTON | "BACK" | OPERABLE |
| OPERATION BUTTON | "NEXT" | INOPERABLE |

↓ EDITING (DESIGNATING PORTIONS TO BE EXCLUDED FROM COMPARISON)

| WINDOW D-1 | | |
|---|---|---|
| TYPE | DATA | OPERABILITY |
| TEXT | "! ITEM 4 IS NOT DESIGNATED." | -- |
| TEXT | "ITEM 1: 2008/04/20 - 2008/04/20" | -- |
| TEXT | "ITEM 2: aaaaaaaa" | -- |
| TEXT | "ITEM 3: bbbb" | -- |
| TEXT | "ITEM 4:" | -- |
| OPERATION BUTTON | "BACK" | OPERABLE |
| OPERATION BUTTON | "NEXT" | INOPERABLE |

FIG. 26

| WINDOW D-2 | | |
|---|---|---|
| TYPE | DATA | OPERABILITY |
| TEXT | "ITEM 1: 2008/06/01 - 2008/06/05" | -- |
| TEXT | "ITEM 2: cccc" | -- |
| TEXT | "ITEM 3: dddddd" | -- |
| TEXT | "ITEM 4: eeeeeeeeeeeeeeee" | -- |
| OPERATION BUTTON | "BACK" | OPERABLE |
| OPERATION BUTTON | "NEXT" | OPERABLE |

GUI EVALUATION SYSTEM, GUI EVALUATION METHOD, AND GUI EVALUATION PROGRAM

TECHNICAL FIELD

The present invention relates to a GUI evaluation system, GUI evaluation method, and GUI evaluation program for evaluating the usability of a system, and more particularly to, a GUI evaluation system, GUI evaluation method, and GUI evaluation program for evaluating the uniqueness and validity of screen names.

BACKGROUND ART

In a system's GUI (graphical user interface), the name of a screen is important information that summarizes the contents of operations to be performed by a user through the screen and information displayed on the screen. It is therefore preferred that the name of a screen be easily understood by the user and formed by a unique verbal expression. The uniqueness of screen names can be evaluated, for instance, by checking whether the same screen name is used for different screens in a system targeted for usability evaluation. When the uniqueness of screen names is to be manually evaluated, an evaluator checks and records the name of each screen in the target system to verify whether or not different screens use the same screen name. Further, in a system where the structures of screens are complex and an on-screen area other than a window title area shows information indicative of an operation to be performed from a screen and a title of displayed information, the evaluator performs an evaluation after locating an on-screen position at which target information (information equivalent to a screen name) is displayed. When such an evaluation is performed manually, increased workload is imposed on the evaluator. Further, the screen name display area located by one evaluator may differ from that is located by another evaluator. Moreover, some evaluators may fail, for instance, to detect all problems. Consequently, the result of evaluation is likely to vary from one evaluator to another.

For example, a first related art is a technology related to a GUI automatic evaluation device that is described in Patent Document 1. The GUI automatic evaluation device inputs screen design guide data, stores the input guide data as formal rules, compares the stored rules against GUI information that includes window-specific attribute information and attribute values representing GUI object data of an evaluation target system, and outputs the window-specific result of comparison to indicate compliance with the rules. Patent Document 1 also describes means for generating GUI information, for instance, from product specifications, sources, and GUI building tools.

A second related art is a technology related to a testing device that is described in Patent Document 2. The testing device is capable of conducting a test in which a predetermined operating procedure is automatically performed. The testing device uses an operation database to store a user sequence which is to be designated by a user at the time of testing, and a complementary sequence which ensures that the user sequence is executed in a specified manner, and verifies the status of a GUI portion when the user sequence is executed in the specified manner. The testing device executes the user sequence whenever it can be executed. However, when the user sequence cannot be executed, the testing device retrieves an appropriate complementary sequence, executes the retrieved complementary sequence, and then executes the user sequence.

A third related art is a technology related to a web screen creation tool and terminology check tool described in Patent Document 3. These tools check a web screen source file by using terminology pre-registered for verifying homonyms, suffixed kana endings, and synonyms which are prone to error when they are written. When any pre-registered term is detected within a web screen to be evaluated, these tools display a list of possible corrections for the detected term.

CITATION LIST

Patent Literature

Patent Document 1 Japanese Patent Application Publication No. 1996-241191
Patent Document 2 Japanese Patent Application Publication No. 2004-110267
Patent Document 3 Japanese Patent Application Publication No. 2004-234402

SUMMARY OF INVENTION

Technical Problem

A problem is that when the uniqueness of screen names used in an evaluation target system is evaluated, increased workload is imposed on evaluators and the result of evaluation is likely to vary from one evaluator to another. More specifically, it is highly likely that the located screen name display area may vary from one evaluator to another, and that some evaluators may fail to detect some problems. One reason is that the evaluators specify, verify, and record the name of each screen and then check whether different screens use the same screen name. Another reason is that it is even more difficult to specify screen names in a system where hierarchical screen names are dispersedly placed at different locations of a screen.

For example, the GUI automatic evaluation device described in Patent Document 1 needs to input screen design guide data and create rules. However, it is difficult to input the screen design guide data for properly creating the rules for evaluating the uniqueness of screen names. The reason is that it is necessary to perform a designation procedure for properly acquiring information equivalent to a screen name because, in some systems, the area for presenting information equivalent to a screen name is not limited to the title portion of a window and may be placed in an area other than the title portion of a window or in a plurality of areas. Further, screens displayed as physically different windows may be regarded as being identical with each other in design due to a system construction. The reason is that the uniqueness of screen names cannot be properly evaluated in the above instance simply by mechanically judging whether the screen names agree with each other.

The testing device described in Patent Document 2 is capable of checking whether a predetermined user sequence is properly executed. For the testing device, however, it is necessary to prepare sequences in accordance with the system to be evaluated. In addition, the testing device cannot evaluate a GUI portion within a sequence execution or evaluate the sequences themselves.

The web screen creation tool and terminology check tool described in Patent Document 3 cannot evaluate the characteristics concerning the usability of unregistered terms.

The present invention has been made in view of the above circumstances. An object of the present invention is to provide a GUI evaluation system, GUI evaluation method, and GUI evaluation program that are capable of easily and accurately evaluating the uniqueness of the name of each screen in a system targeted for evaluation.

Solution to Problem

A GUI evaluation system according to the present invention is a GUI evaluation system comprising GUI information acquisition means and screen name evaluation means. The GUI information acquisition means acquires a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquires information about components used in a contents display area where the contents of the lowest-level screen name existing in the evaluation target screen are displayed as a title. The screen name evaluation means evaluates the uniqueness of screen names in the evaluation target system in accordance with information about the level-specific screen name in each evaluation target screen, the level-specific screen name being acquired by the GUI information acquisition means, and in accordance with the information about the components included in the contents display area of each evaluation target screen.

A GUI evaluation method according to the present invention is a GUI evaluation method comprising the steps of: acquiring a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquiring information about components used in a contents display area where the contents of the lowest-level screen name existing in the evaluation target screen are displayed as a title; and evaluating the uniqueness of screen names in the evaluation target system in accordance with information about the level-specific screen name in each evaluation target screen, which is acquired by the GUI information acquisition means, and in accordance with the information about the components included in the contents display area of each evaluation target screen.

A GUI evaluation program according to the present invention is a GUI evaluation program making a computer perform: a GUI information extraction process for acquiring a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquiring information about components used in a contents display area where the contents of the lowest-level screen name existing in the evaluation target screen are displayed as a title; and a screen name judgment process for evaluating the uniqueness of screen names in the evaluation target system in accordance with information about the level-specific screen name in each evaluation target screen, which is acquired by the GUI information acquisition means, and in accordance with the information about the components included in the contents display area of each evaluation target screen.

Advantageous Effects of the Invention

The present invention makes it possible to easily and accurately evaluate the uniqueness of the name of each screen in an evaluation target system. Particularly, the present invention acquires level-specific screen names at individual hierarchical levels from screens in which hierarchical screen names are scattered. Therefore, even when the evaluation target system has hierarchical screen names that are dispersedly placed at different locations of a screen, the present invention makes it possible to easily and accurately evaluate the uniqueness of the screen names.

The reason is that the present invention specifies and extracts the hierarchical-level-specific screen names of various screens in a manner designated by an evaluator, and checks all hierarchical levels to determine whether a plurality of screens have the same screen names. When a plurality of screens have the same screen names, the present invention compares the components of the screens to judge whether some screens have the same screen names, whether entirely different screens use the same screen names, and whether a plurality of identical screens merely display different information.

BRIEF DESCRIPTION OF DRAWINGS

FIG. 4 It depicts an example of a screen possessed by an evaluation target system 6.

FIG. 5 It depicts an example of level-specific screen name information stored in a GUI information recording section 5.

FIG. 6 It depicts an example of configuration information stored in the GUI information recording section 5.

FIG. 8 It depicts a flowchart illustrating an example of a screen name judgment operation by a screen name judgment section 4.

FIG. 9 It depicts a screen example of the evaluation target system 6 (business system A).

FIG. 10 It depicts an example of configuration information about window A-1.

FIG. 11 It depicts an output example of a screen name uniqueness judgment result.

FIG. 14 It depicts an example of level-specific screen name information stored in the GUI information recording section 5.

FIG. 15 It depicts an output example of a screen name uniqueness judgment result.

FIG. 16 It depicts a screen example of the evaluation target system 6 (business system C).

FIG. 17 It depicts a screen example of the evaluation target system 6 (business system C).

FIG. 18 It depicts a screen example of the evaluation target system 6 (business system C).

FIG. 19 It depicts an output example of a screen name uniqueness judgment result.

FIG. 20 It depicts examples of screens and judgment results of the evaluation target system 6.

FIG. 21 It depicts another output example of a screen name uniqueness judgment result.

FIG. 25 It depicts an example of identity judgment target designation by a configuration information designation section 7.

FIG. 26 It depicts an example of configuration information about window D-2.

DESCRIPTION OF EMBODIMENTS

Figure 1:
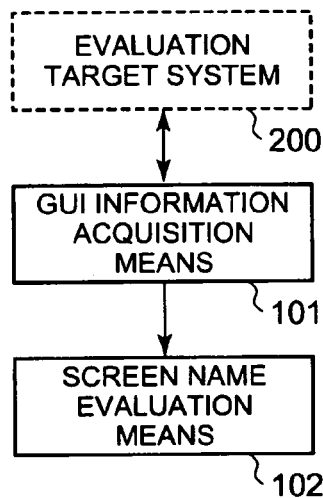
FIG. 1 It depicts a block diagram illustrating an example configuration of a GUI evaluation system according to the present invention.

Embodiments of the present invention will now be described with reference to the accompanying drawings. FIG. 1 is a block diagram illustrating an example configuration of a GUI evaluation system according to the present invention. The GUI evaluation system shown in FIG. 1 includes GUI information acquisition means 101 and screen name evaluation means 102.

The GUI information acquisition means 101 acquires a screen name which is classified according to a hierarchical level and displayed in an evaluation target screen possessed by the evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names; and acquires information about components used in a contents display area where the contents of the lowest-level screen name existing in the evaluation target screen are displayed as a title.

The screen name evaluation means 102 evaluates the uniqueness of screen names in the evaluation target system in accordance with the information about the level-specific screen name in each evaluation target screen, which is acquired by the GUI information acquisition means 101, and in accordance with the information about the components included in the contents display area of each evaluation target screen. Here, evaluating the uniqueness of screen names includes the steps of checking for a screen that has a screen name uniqueness problem or requires attention, and specify such a screen.

When a plurality of evaluation target screens have the same screen names at all levels, the screen name evaluation means 102 may evaluate the uniqueness of screen names in the evaluation target system by further judging whether the components included in the contents display areas of the evaluation target screens having the same screen names are identical with each other.

When a plurality of evaluation target screens have the same screen names at all levels, and the components included in the contents display areas of the evaluation target screens having the same screen names and subjected to identity judgment differ at least in the number of included components, in the order of component arrangement, or in the style of screen output other than output text of a text input/output part that accepts a user input, the screen name evaluation means 102 may conclude that there is a uniqueness problem with the screen names.

When the components included in the contents display areas of the evaluation target screens having the same screen names and subjected to identity judgment differ only in the output text of a text input/output part that accepts a user input, the screen name evaluation means 102 may conclude that there is a uniqueness problem with the screen names.

Figure 2:
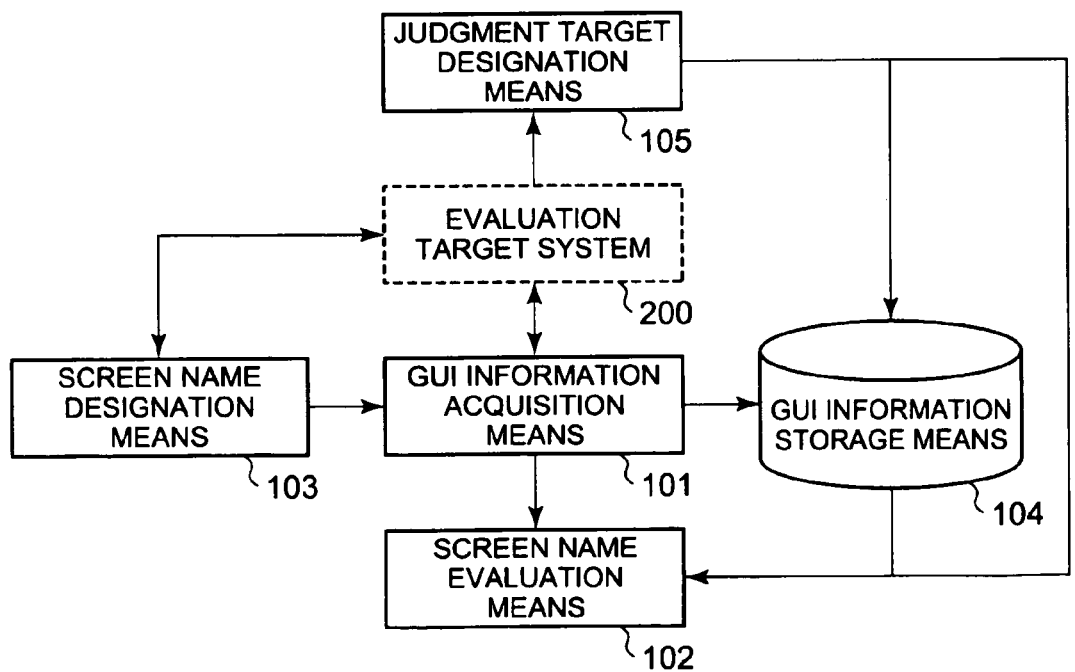
FIG. 2 It depicts a block diagram illustrating another example configuration of the GUI evaluation system according to the present invention.

FIG. 2 is a block diagram illustrating another example configuration of the GUI evaluation system according to the present invention. As shown in FIG. 2, the GUI evaluation system may further include screen name designation means 103. The screen name designation means 103 generates screen name designation information for indicating a screen name display location used to display at least part of information equivalent to a screen name in a screen of an evaluation target system, as classified according to hierarchical level within a hierarchical structure formed by screen names, in accordance with a user operation relative to the screen of the evaluation target system. In such an instance, the GUI information acquisition means 101 can acquire the information about a level-specific screen name in each evaluation target screen and the information about the components included in the contents display area of each evaluation target screen in accordance with the screen name designation information generated by the screen name designation means 103.

As shown in FIG. 2, the GUI evaluation system may further include GUI information storage means 104. The GUI information storage means 104 stores GUI information about the evaluation target system. The GUI information is acquired by the GUI information acquisition means 101 and includes information about a level-specific screen name in each evaluation target screen and information about the components included in the contents display area of each evaluation target screen. In such an instance, the screen name evaluation means 102 can evaluate the uniqueness of screen names in the evaluation target system in accordance with relevant information stored in the GUI information storage means 104, namely, the information about a level-specific screen name in each evaluation target screen and the information about the components included in the contents display area of each evaluation target screen.

As shown in FIG. 2, the GUI evaluation system may further include judgment target designation means 105. In accordance with a user operation, the judgment target designation means 105 specifies whether components included in an evaluation target screen of the evaluation target system or the screen output style attributes of the components are to be excluded from identity judgment. When designated components or their screen output style attributes are excluded from identity judgment by the judgment target designation means 105, the screen name evaluation means 102 can operate so that the designated components or a screen output style affected by the attributes of the designated components will be excluded from component identity judgment.

First Embodiment

Figure 3:
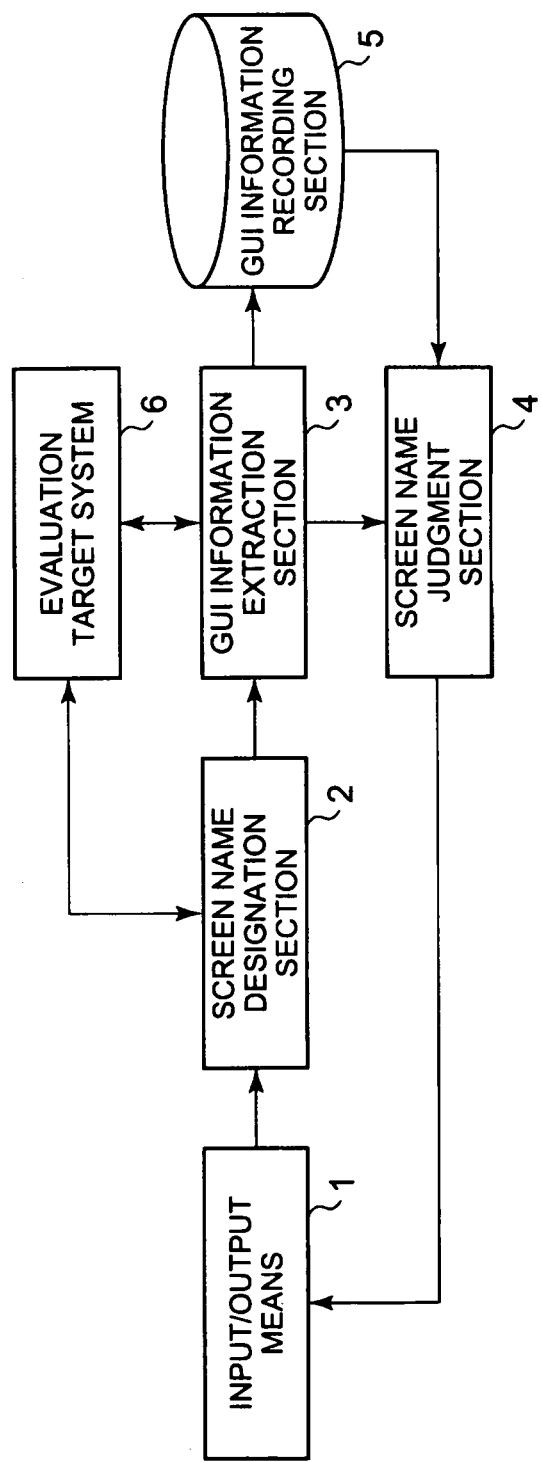
FIG. 3 It depicts a block diagram illustrating an example configuration of the GUI evaluation system according to a first exemplary embodiment of the present invention.

Embodiments of the present invention will now be described in greater detail. FIG. 3 is a block diagram illustrating an example configuration of the GUI evaluation system according to a first exemplary embodiment of the present invention. As shown in FIG. 3, the GUI evaluation system according to the first exemplary embodiment includes input/output means 1, a screen name designation section 2, a GUI information extraction section 3, a screen name judgment section 4, and a GUI information recording section 5.

The screen name designation section 2 is a processing section equivalent to the aforementioned screen name designation means 103. The GUI information extraction section 3 is a processing section equivalent to the aforementioned GUI information acquisition means 101. The screen name judgment section 4 is a processing section equivalent to the aforementioned screen name evaluation means 102. The GUI information recording section 5 is a storage section equivalent to the aforementioned GUI information storage means 104.

The input/output means 1 includes input means and output means. The input means is a mouse, keyboard, or other device for entering information that specifies the operation to be performed by an evaluator. The output means is a display or other output device.

In accordance with the information about the operation to be performed by an operator, which is input through the input/output means 1, the screen name designation section 2 designates at least one screen name display location at which information equivalent to a screen name in a screen of an evaluation target system 6 is to be displayed (or more specifically, a location at which at least part of the information equivalent to the screen name is to be displayed) as well as a level of the screen name designated by the information to be displayed at the location (a hierarchical level within a hierarchical structure formed by screen names). To be more precise, the above designation is accomplished by generating information that describes the designation and can be recognized by the later-described GUI information extraction section 3. In the present exemplary embodiment, information indicating a screen name display location as classified according to screen name level is output to the GUI information extraction section 3 as screen name designation information. For example, information including the information indicative of a screen name display location and the information indicative of the level of a screen name to be displayed at the screen name display location may be output to the GUI information extraction section 3 as the screen name designation information.

The method of designating the screen name display location varies with the configuration of the evaluation target system 6 (varies depending, for instance, on whether a system running on a client PC in off-line mode, a client/server type system, or a web system is used). When, for instance, a user operation performed relative to a displayed screen indicates a certain point or range within a screen, the designation may be accomplished by acquiring the information about the displayed screen, making a layout analysis, and specifying a relative position in the screen, or accomplished by analyzing the structure of an HTML or other structured document, specifying a screen name display portion (e.g., a hierarchical position within a structured document or the label name of a tab), and entering level information indicating the level of a screen name formed by text displayed at the specified portion. Either of these two designation methods can be implemented by using an existing technology. The screen name designation information may be such that a hierarchical-level-specific screen name display location can be specified. It may be entered directly through the input/output means 1 without using the screen name designation section 2.

The GUI information extraction section 3 references the screen name designation information output from the screen name designation section 2, acquires a level-specific screen name (or more specifically, information equivalent to a screen name) used in each screen of the evaluation target system 6, and stores the acquired screen name (level-specific screen name) in the GUI information recording section 5 as GUI information together with the level information about the screen name. The level-specific screen name and level information stored in the GUI information recording section 5 as GUI information will be hereinafter referred to as level-specific screen name information. In a case where no text (displayed text information) exists at a location corresponding to a screen name display location within a screen, the GUI information extraction section 3 stores information indicating that the location is null, namely, no screen name exists at a target level.

Further, in each screen of the evaluation target system 6, the GUI information extraction section 3 acquires information about components (input/output parts) used in a contents display area where the contents of the lowest-level screen name which exists at the lowest hierarchical level in the screen are displayed as a title, and stores the acquired information in the GUI information recording section 5 as configuration information. The contents display area is, for example, an area of a frame (or a pane) that forms an area corresponding to the lowest-level screen name display location. Alternatively, the contents display area may be positioned below a screen name display location within a screen area containing the lowest-level screen name display location. Further, the contents display area may be changed to a specific area depending on the type of a part that displays a screen name detected at the screen name display location. The contents display area targeted for acquiring the information about the components may be hereinafter referred to as an acquisition target area. When the level-specific screen name information and configuration information about all evaluation target screens are completely recorded, a GUI information extraction completion notification is output to the screen name judgment section 4 to indicate the completion of such information recording.

The information about screen names and components can also be acquired by using an accessibility API, such as MSAA (Microsoft Active Accessibility) for Windows (registered trademark) or ATK (Linux Accessibility Toolkit) for Linux (registered trademark), as well as by making the aforementioned screen layout analysis or structured document analysis.

FIG. 4 shows an example of a screen possessed by the evaluation target system 6. When, in a screen named window A-1, the title portion of the window (area A11 in FIG. 4) is designated as a window name display location for the highest hierarchical level (level 0) and the upper left corner of the window (area A12 in FIG. 4) is designated as a window name display location for a lower level (level 1), area A13 which is positioned below the screen name display location in a screen area containing the screen name display location for level 1 (lowest level) is an area targeted for configuration information acquisition. Alternatively, components excluding the screen name display location may be targeted for configuration information acquisition after an area containing the screen name display location is designated as an area targeted for configuration information acquisition.

FIG. 5 shows an example of level-specific screen name information that is included in the GUI information stored in the GUI information recording section 5. As shown in FIG. 5, the level-specific screen name information may include, for instance, a level and a screen name for the level. The level-specific screen name information exists for each screen. Therefore, the stored level-specific screen name information may be associated with a screen identifier that identifies individual screens. In the example shown in FIG. 5, as the level-specific screen name information about window A-1, the GUI information recording section 5 stores "Business System A" as the screen name for level 0 (Lv0) and "Request for Business Trip" as the screen name for level 1 (Lv1).

FIG. 6 shows an example of configuration information that is included in the GUI information stored in the GUI information recording section 5. As shown in FIG. 6, the configuration information may include, for instance, the type of a component included in an acquisition target area (text, text box, list box, combo box, radio button, check box, operation button, or other input/output part), the description of data displayed by the input/output part, and operability.

The aforementioned "text" which is one type of a component is a part having a text information (character information) output area. It may be referred to as a text field or label depending on the employed screen implementation method. In a case where text is not implemented as an explicit part due, for instance, to the use of HTML, a scheme for outputting a bunch of text information, which is a part of a component of a screen, may be regarded as a text part. The aforementioned "text box" is a part that includes a text information input/output area and allows a user to enter desired data (text information). The text box or other similar part that permits the user to enter desired text information will be hereinafter referred to as a user-inputtable text input/output part. The aforementioned "list box" is a part that has an output area for outputting information in a list form and an input area for allowing the user to select one of listed options. In the above example, a part that permits the user to enter desired data instead of listed options is referred to as a "combo box" and differentiated from the list box. The aforementioned "radio button" is a part that has an output area for listing a group of options and an intention indication area for selecting one of the listed options (a status display area for indicating whether an option is selected or deselected). The aforementioned "check box" is a part having an output area for presenting an option and an intention indication area for selecting the presented option (a status display area for indicating "Yes" or "No" to the presented option). In addition, an image output part and a menu output part may be used as well. In any case, parts that can be identified by information available to the GUI information extraction section 3 are classified as the types of components. The types are determined in accordance with a screen implementation method used for the evaluation target system 6. To help the screen name judgment section 4 formulate a judgment with ease, the GUI information extraction section 3 may judge according to the type of component whether a component is a user-inputtable text input/output part, and incorporate the result of judgment (information indicating whether the component is a user-inputtable text input/output part) into the configuration information.

The configuration information also exists for each screen. Therefore, the stored configuration information may be associated with a screen identifier that identifies individual screens. In the example shown in FIG. 6, area A13 which is an area in window A-1 shown in FIG. 4, is regarded as an acquisition target area; therefore, the type, data description, and operability of components (input/output parts in the present example) disposed in area A13 are sequentially stored. The order in which the components are registered as the configuration information represents the order in which they are arranged in the area. In the present example, the components are sequentially detected from upper left to lower right in such a manner as to draw the letter Z; therefore, the order in which the components are detected represents the order in which they are arranged in the area.

For example, FIG. 6 indicates that the type of a component disposed at the upper left corner of area A23 which is positioned below an area where the lowest-level screen name in window A-1 is displayed, is "Text", and that the data description of the component is "Item 1:". In a case where the type is "text", the information about operability is "--" (inoperable) because user operability does not change. Further, FIG. 6 indicates that a component operable by the user is placed next to the abovementioned "Text", and that the type of this component is "Text Box", and further that the data description of this component is "Null".

The screen name judgment section 4 receives the GUI information extraction completion notification from the GUI information extraction section 3, references the GUI information (level-specific screen name information and configuration information) stored in the GUI information recording section 5, and checks whether a plurality of screens have the same screen names at all levels. When a plurality of screens do not have the same screen names at all levels, the screen name judgment section 4 concludes that there is no uniqueness problem with the screen names in the evaluation target system 6. When a plurality of screens have the same screen names at all levels, the screen name judgment section 4 compares the configuration information between the associated screens to check whether the included components differ, for instance, in the number of components, the order of component arrangement, the type of component, or in the screen output style such as the data description and operability of each component. In a case where the components do not differ from each other, the screen name judgment section 4 concludes that there might be a uniqueness problem instead of concluding that there is a uniqueness problem because the associated screens might be equal in displayed information and in design. In a case where, on the other hand, the components differ from each other, the screen name judgment section 4 judges that the associated screens differ in displayed information and in design, thereby concluding that there is a uniqueness problem.

When components are to be subjected to identity judgment, the screen name judgment section 4 may operate so that the data description of a component whose type is a user-inputtable text input/output part (text box, list box, etc.) will be excluded from component identity judgment. The reason is that the data description displayed by a user-inputtable text input/output part is not screen-specific information but is frequently used to display the operation status which varies with a user operation.

The screen name judgment section 4 outputs the result of judgment thereby to the input/output means 1.

In the present exemplary embodiment, the screen name designation section 2, the GUI information extraction section 3, and the screen name judgment section 4 are implemented, for instance, by a CPU that operates in accordance with a program.

Figure 7:
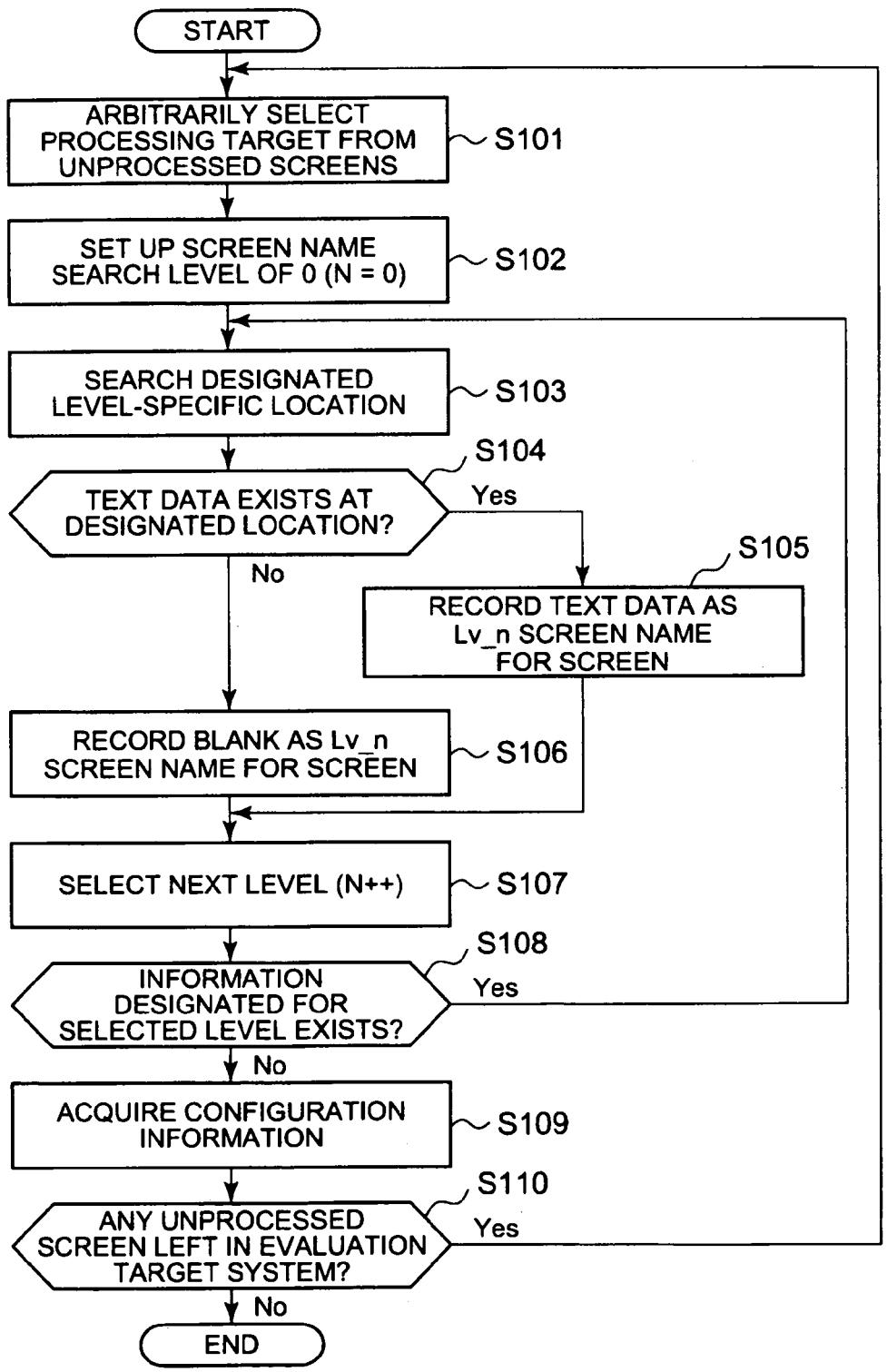
FIG. 7 It depicts a flowchart illustrating an example of a GUI information extraction operation by a GUI information extraction section 3.

An operation of the present exemplary embodiment will now be described. FIG. 7 is a flowchart illustrating an example of a GUI information extraction operation by the GUI information extraction section 3. The GUI information extraction operation begins when the screen name designation information is received after a level-specific screen name designation operation is completed by the screen name designation section 2. As shown in FIG. 7, upon receipt of the screen name designation information from the screen name designation section 2, the GUI information extraction section 3 arbitrarily selects a processing target screen from unprocessed evaluation target screens possessed by the evaluation target system 6 (step S101).

Upon completion of processing target screen selection, the GUI information extraction section 3 sets up level 0 (Lv0) which is the highest level as a screen name search level (step S102). Next, the GUI information extraction section 3 searches a designated level-specific location (screen name display location) in accordance with the selected search level (step S103).

When text data exists in an area corresponding to the screen name display location at the current search level within the processing target screen (when the query in step S104 is answered "YES"), the GUI information extraction section 3 concludes that the text data is a screen name at the current search level within the processing target screen, generates level-specific screen name information accordingly, and records the generated level-specific screen name information in the GUI information recording section 5 (step S105). When, on the other hand, no text data exists in the area corresponding to the screen name display location at the current search level (when the query in step S104 is answered "NO"), the GUI information extraction section 3 concludes that the screen name at the current search level within the processing target screen is null, generates level-specific screen name information accordingly, and records the generated level-specific screen name information in the GUI information recording section 5 (step S106).

After the level-specific screen name information about the current search level is completely recorded, the GUI information extraction section 3 selects the next level (low level) as the search level. When the screen name designation information includes information specifying the screen name display location at the selected search level (when the query in step S108 is answered "YES"), the GUI information extraction section 3 repeats steps S103 to S106 for the selected search level. When steps S103 to S108 are performed, screen names at all selected levels are acquired from a single screen.

When, on the other hand, the information specifying the screen name display location at the selected search level is not found when the low level is selected as the next search level (when the query in step S108 is answered "NO"), the GUI information extraction section 3 concludes that the search has been completed for screen names at all selected levels, and acquires configuration information on the basis of the screen name display location at the lowest level (step S109). The process for an evaluation target screen is now completed. When there is any unprocessed evaluation target screen (when the query in step S110 is answered "YES"), the GUI information extraction section 3 returns to step S101, selects the next processing target screen, and repeats the same operation as described above. When there is no more unprocessed evaluation target screen (when the query in step S110 is answered "NO"), the GUI information extraction section 3 terminates GUI information extraction operation thereby.

A screen name judgment operation by the screen name judgment section 4 will now be described. FIG. 8 is a flowchart illustrating an example of a screen name judgment operation by the screen name judgment section 4. The screen name judgment operation begins when the GUI information extraction completion notification is received after a GUI information extraction operation is completed by the GUI information extraction section 3. As shown in FIG. 8, upon receipt of the GUI information extraction completion notification from the GUI information extraction section 3, the screen name judgment section 4 searches the evaluation target screens for sets of two or more screens that have the same screen names at all levels (step S201).

When sets of screens having the same screen names at all levels are found in the search (when the query in step S202 is answered "YES"), the screen name judgment section 4 selects a processing target screen set from the sets of screens having the same screen names at all levels (step S203). If, for instance, there are screen set 1 which includes two or more screens having a level 0 screen name of "AAA" and a level 1 screen name of "BBB", and screen set 2 which includes two or more screens having a level 0 screen name of "AAA" and a level 1 screen name of "CCC", either screen set 1 or screen set 2 may be selected as the processing target screen set.

After the processing target screen set is selected, the screen name judgment section 4 compares the components between the screens included in the processing target screen set (step S204). When the comparison indicates that the components differ from each other (when, in the present example, the components arranged in the same order differ in the type or text description (data description)) (when the query in step S205 is answered "YES"), the screen name judgment section 4 concludes that there is a uniqueness problem with the screen names in the compared screens (step S107).

When, on the other hand, the comparison indicates that the components do no differ from each other (when, in the present example, the components arranged in the same order do not differ in the type or text description), the screen name judgment section 4 concludes that there might be a uniqueness problem with the screen names in the compared screens (concludes that the compared screens require attention) because the compared screens might be identical with each other (step S108).

The screen name judgment section 4 repeats steps S204 to S207 until the component identity judgment operation is completed for all screen combinations involved in the processing target screen set (returns to step S204 when the query in step S208 is answered "NO"). When the component identity judgment operation is completed for all screen combinations (when the query in step S208 is answered "YES") and an unprocessed set of screens having the same screen names still exists (when the query in step S209 is answered "YES"), the screen name judgment section 4 returns to step S203, selects the next screen set to be processed, and repeats the same operation as described above. When the above judgment process is completed for all screen sets having the same screen names at all levels (when the query in step S209 is answered "NO"), the screen name judgment section 4 concludes that there is no problem with screens excluded from the above screen sets (screens that do not have the same screen names as the other screens and are not judged to have a problem or attention) (step S210).

When screen sets having the same screen names are not found in step S202 (when the query in step S202 is answered "NO"), the screen name judgment section 4 jumps to step S210 and concludes that all screens have no problem.

An operation of the present exemplary embodiment will now be described with reference to concrete screen examples. A first concrete example relates to business system A which has window A-1 shown in FIG. 4 and window A-2 shown in FIG. 9, and assumes that windows A-1 and A-2 are handled as the evaluation target screens.

First of all, the evaluator uses either of the two evaluation target screens and specifies, through the input/output means 1, the location at which information corresponding to a screen name is displayed and the level of the screen name indicated by the information displayed at the specified location. Here, window A-1 shown in FIG. 4 is used to designate a window title area (area A11) as a level 0 screen name display location. Further, an on-screen area (area A12) where the uppermost leftmost text is disposed as a level 1 screen name display location. When the window title area is constantly used as the level 0 screen name display location, it is possible to skip the designation procedure for level 0.

In accordance with operation information that is input by the operator through the input/output means 1, the screen name designation section 2 generates screen name designation information, which associates the level 0 screen name display location with information indicative of the window title area and the level 1 screen name display location with information indicative of the uppermost leftmost text area. Alternatively, for example, the evaluator may designate "Business System A", which is the text displayed in the window title area, as a level 0 screen name and "Request for Business Trip", which is the text displayed at the upper left corner of the screen, as a level 1 screen name to let the screen name designation section 2 designate the individual text display areas (areas A11 and A12) as the screen name display locations for the associated levels in accordance with the above operation information.

Next, the GUI information extraction section 3 sequentially acquires the information about evaluation target screens and then acquires level-specific screen names of each evaluation target screen in accordance with the screen name designation information. In the present example, the GUI information extraction section 3 extracts "Business System A", which is the text displayed in the window title area (area A11) of window A-1, as a level 0 screen name of window A-1, extracts "Request for Business Trip", which is the text displayed at the uppermost leftmost corner (area A12) of window A-1, as a level 1 screen name of window A-1, and records these two pieces of text and the level information about the screen names in the GUI information recording section 5 as level-specific screen name information. Then, as regards an area (area A13) other than the screen name portion in a screen area containing "Request for Business Trip", which is the lowest-hierarchical-level (lowest-level) screen name in window A-1, the GUI information extraction section 3 acquires information about included components, converts the acquired information to configuration information, and records the configuration information in the GUI information recording section 5. It should be noted that the GUI information extraction section 3 may record the acquired component information in the GUI information recording section 5 as the configuration information.

Next, the GUI information extraction section 3 subjects window A-2 to the same process as described above, generates the level-specific screen name information and the configuration information, and records the generated information in the GUI information recording section 5. More specifically, the GUI information extraction section 3 extracts "Business System A", which is the text displayed in the window title area (area A21 shown in FIG. 9) of window A-2, as a level 0 screen name, extracts "Request for Business Trip", which is the text displayed at the uppermost leftmost corner (area A22) of window A-2, as a level 1 screen name, and records these two pieces of text and the level information about the screen names in the GUI information recording section 5 as the level-specific screen name information. Further, the GUI information extraction section 3 acquires information about components included in an area (area A23) other than the screen name portion in a screen area containing "Request for Business Trip", which is the lowest-hierarchical-level (lowest-level) screen name in window A-2, converts the acquired information to configuration information, and records the configuration information in the GUI information recording section 5. FIG. 10 shows an example of configuration information about window A-2, which is stored in the GUI information recording section 5.

When the GUI information extraction operation is completed by the GUI information extraction section 3, the screen name judgment section 4 references the level-specific screen name information stored in the GUI information recording section 5, and checks whether a plurality of screens have the same screen names at all levels. In the present example, the screen name judgment section 4 confirms that windows A-1 and A-2 have the same screen names at all levels (level 0 and level 1). Thus, the screen name judgment section 4 compares the configuration information between windows A-1 and A-2 to check whether they have different components. For example, the screen name judgment section 4 checks for difference in the number of components, the type-specific order of component arrangement, and the data description of components arranged in the same order (except for the data description of a user-inputtable text input/output part). It should be noted that not only the data description but also the other attribute information (operability) about components arranged in the same order may be subjected to judgment. In the present example, the configuration information about acquisition target area A13 in window A-1 shown in FIG. 6 is compared against the configuration information about acquisition target area A23 in window A-2 shown in FIG. 10 to find that the text and buttons agree with each other in the data as well. However, it is also found that some input parts, such as a text box and a list box, differ in the type. Therefore, the screen name judgment section 4 judges that the components differ from each other, differentiates window A-1 from window A-2 although they have the same screen names, and concludes that there is a uniqueness problem with the screen names in windows A-1 and A-2.

FIG. 11 shows an output example of a screen name uniqueness judgment result concerning windows A-1 and A-2, which are the evaluation target screens titled "Business System A". In the example shown in FIG. 11, the level-specific screen names are indicated on an individual level basis, integrated, and specified as screen names in the evaluation target system 6. Further, the identifiers of the associated screens (the "screens" are units targeted for screen information acquisition and handled as separate evaluation target screens by the GUI information extraction section 3) are output after being associated with the presence of a uniqueness problem with the screen names. This makes it possible to understand that there is a uniqueness problem with the presented screen names, and that the problematic screens are windows A-1 and A-2.

As described above, when the level-specific screen name information and configuration information about all evaluation target screens in an evaluation target system are acquired in accordance with screen name display locations and hierarchical levels designated by the evaluator in relation to an arbitrary screen in the evaluation target system to check whether a plurality of screens have the same screen names, and when a plurality of screens have the same screen names, the components are checked to determine whether they differ, the uniqueness of screen names can be evaluated even if the evaluation target system is configured so that some pieces of information (screen names) serving as a title describing a current screen (operation) are dispersedly placed within a screen.

A second concrete example of an operation of the present exemplary embodiment will now be described. The second concrete example relates to business system B, which has window B-1 shown in FIG. 12 and window B-2 shown in FIG. 13, and assumes that windows B-1 and B-2 are handled as the evaluation target screens.

Figure 12:
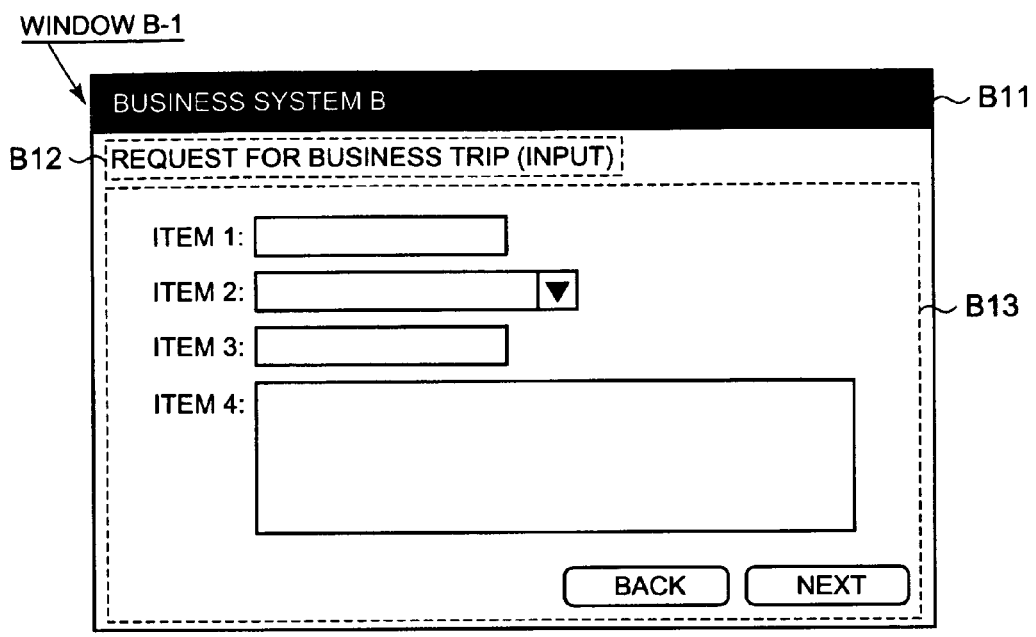
FIG. 12 It depicts a screen example of the evaluation target system 6 (business system B).
Figure 13:
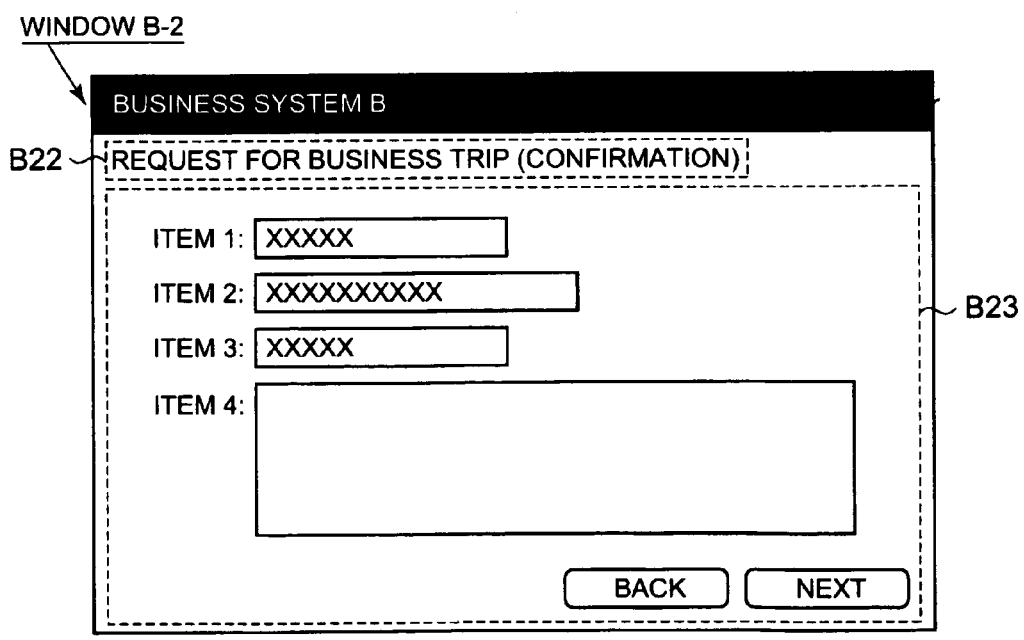
FIG. 13 It depicts a screen example of the evaluation target system 6 (business system B).

First of all, the evaluator uses either of the two evaluation target screens and specifies, through the input/output means 1, the location at which information corresponding to a screen name is displayed and the level of the screen name indicated by the information displayed at the specified location. Here, window B-1 shown in FIG. 12 is used to designate a window title area (area B11) as a level 0 screen name display location. Further, an on-screen area (area B12) where the uppermost leftmost text is disposed is designated as a level 1 screen name display location. When the window title area is constantly used as the level 0 screen name display location, it is possible to skip the designation procedure for level 0.

In accordance with operation information that is input by the operator through the input/output means 1, the screen name designation section 2 generates screen name designation information, which associates the level 0 screen name display location with information indicative of the window title area and the level 1 screen name display location with information indicative of the uppermost leftmost text area. Alternatively, for example, the evaluator may designate "Business System B", which is the text displayed in the window title area, as a level 0 screen name and "Request for Business Trip (Input)", which is the text displayed at the upper left corner of the screen, as a level 1 screen name to let the screen name designation section 2 designate the individual text display areas (areas B11 and B12) as the screen name display locations for the associated levels in accordance with the above operation information.

Next, the GUI information extraction section 3 sequentially acquires the information about evaluation target screens and then acquires level-specific screen names of each evaluation target screen in accordance with the screen name designation information. In the present example, the GUI information extraction section 3 extracts "Business System B", which is the text displayed in the window title area (area B11) of window B-1, as a level 0 screen name of window B-1, extracts "Request for Business Trip (Input)", which is the text displayed at the uppermost leftmost corner (area B12) of window B-1, as a level 1 screen name of window A-1, and records these two pieces of text (data descriptions) and the level information about the screen names in the GUI information recording section 5 as level-specific screen name information. Then, as regards an area (area B13) other than the screen name portion in a screen area containing "Request for Business Trip (Input)", which is the lowest-hierarchical-level (lowest-level) screen name in window B-1, the GUI information extraction section 3 acquires information about included components, converts the acquired information to configuration information, and records the configuration information in the GUI information recording section 5.

Next, the GUI information extraction section 3 subjects window B-2 to the same process as described above, generates the level-specific screen name information and the configuration information, and records the generated information in the GUI information recording section 5. More specifically, the GUI information extraction section 3 extracts "Business System B", which is the text displayed in the window title area (area B21 shown in FIG. 13) of window B-2, as a level 0 screen name, extracts "Request for Business Trip (Confirmation)", which is the text displayed at the uppermost leftmost corner (area B22) of window B-2, as a level 1 screen name, and records these two pieces of text and the level information about the screen names in the GUI information recording section 5 as the level-specific screen name information. Further, the GUI information extraction section 3 acquires information about components included in an area (area B23) other than the screen name portion in a screen area containing "Request for Business Trip (Confirmation)", which is the lowest-hierarchical-level (lowest-level) screen name in window B-2, converts the acquired information to configuration information, and records the configuration information in the GUI information recording section 5. FIG. 14 shows an example of level-specific screen name information about windows B-1 and B-2, which is stored in the GUI information recording section 5.

When the GUI information extraction operation is completed by the GUI information extraction section 3, the screen name judgment section 4 references the level-specific screen name information stored in the GUI information recording section 5, and checks whether a plurality of screens have the same screen names at all levels. In the present example, windows B-1 and B-2 disagree with each other in the level 1 screen name. Therefore, the screen name judgment section 4 finds that windows B-1 and B-2 are different screens having different screen names, and concludes that there is no uniqueness problem with the screen names in windows B-1 and B-2.

FIG. 15 shows an output example of a screen name uniqueness judgment result concerning windows B-1 and B-2, which relate to business system B. In the example shown in FIG. 15, the level-specific screen names are indicated on an individual level basis, integrated, and specified as screen names in the evaluation target system 6. Further, the identifiers of the associated screens are output after being associated with the presence of a uniqueness problem with the screen names. This makes it possible to understand that there is no uniqueness problem with the presented screen names.

As described above, when the level-specific screen name information and configuration information about all evaluation target screens in an evaluation target system are acquired in accordance with screen name display locations and hierarchical levels designated by the evaluator in relation to an arbitrary screen in the evaluation target system to check whether a plurality of screens have the same screen names at all levels, and when a plurality of screens have the same screen names, the evaluation target screens are checked to determine whether they agree in the component information, the uniqueness of screen names can be evaluated even if the evaluation target system is configured so that some pieces of information (screen names) serving as a title describing a current screen (operation) are dispersedly placed within a screen.

A third concrete example of an operation of the present exemplary embodiment will now be described. The third concrete example relates to business system C, which has window C-1 shown in FIG. 16, window C-2 shown in FIG. 17, and window C-3 shown in FIG. 18, and assumes that windows C-1, C-2, and C-3 are handled as the evaluation target screens.

As shown in FIGS. 16, 17, and 18, the windows for business system C are divided into two frames (or panes). The left-hand frame area (e.g., area C12 shown in FIG. 16) displays a menu of business operations to be performed in business system C. The right-hand frame area (e.g., area C13 shown in FIG. 16) displays information for performing the individual business operations. Business system C is configured so that windows C-2 and C-3 display detailed information about an option selected from a list displayed in window C-1. Windows C-2 and C-3 have the same functions and roles, but differ in the target of data display (the option selected from the list in window C-1).

First of all, the evaluator uses one of the evaluation target screens and specifies, through the input/output means 1, the location at which information corresponding to a screen name is displayed and the level of the screen name indicated by the information displayed at the specified location. Here, window C-2 shown in FIG. 17 is used to designate a window title area (area C21) as a level 0 screen name display location. Further, the right-hand frame area (area C22) where the uppermost leftmost text is disposed is designated as a level 1 screen name display location. Moreover, an area (area C23) where underlying tabs are disposed is designated as a level 1 screen name display location. When the window title area is constantly used as the level 0 screen name display location, it is possible to skip the designation procedure for level 0.

In accordance with operation information that is input by the operator through the input/output means 1, the screen name designation section 2 generates screen name designation information, which associates the level 0 screen name display location with information indicative of the window title area, associates the level 1 screen name display location with information indicative of the uppermost leftmost text area in the right-hand frame area of a screen, and associates the level 2 screen name display location with information indicative of a tab group area positioned below the text area at the level 1 screen name display location. When the tab group area is to be designated as a screen name display location, it is assumed that the text for a currently selected tab in the tab group indicates a screen name at the current level. Alternatively, for example, the evaluator may designate "Business System C", which is the text displayed in the window title area, as a level 0 screen name, "Request for Business Trip>Result Confirmation", which is the text displayed at the upper left corner of the right-hand frame in the screen, as a level 1 screen name, and "Registration Information 1", which is the text in the currently selected tab in the underlying tab group, as a level 2 screen name to let the screen name designation section 2 designate the individual text display areas (areas C31, C32, and C33) as the screen name display locations for the associated levels in accordance with the above operation information.

Next, the GUI information extraction section 3 sequentially acquires the information about evaluation target screens and then acquires level-specific screen names of each evaluation target screen in accordance with the screen name designation information. In the present example, the GUI information extraction section 3 extracts "Business System C", which is the text displayed in the window title area (area C11 shown in FIG. 16) of window C-1, as a level 0 screen name of window C-1, and extracts "Request for Business Trip>Result Confirmation", which is the text displayed at the upper left corner of the right-hand frame (area C131) of window C-1, as a level 1 screen name of window C-1. Further, as no tabs are found below the text at the level 1 screen name display location as a result of search, the GUI information extraction section 3 extracts a null screen name as a level 2 screen name. The GUI information extraction section 3 then records the extracted pieces of text (data descriptions) and the level information about the screen names in the GUI information recording section 5 as level-specific screen name information. Next, as regards an area (area C132) other than the screen name portion in a screen area containing "Request for Business Trip>Result Confirmation", which is the lowest-hierarchical-level screen name in window C-1, the GUI information extraction section 3 acquires information about included components, converts the acquired information to configuration information, and records the configuration information in the GUI information recording section 5.

Further, the GUI information extraction section 3 subjects windows C-2 and C-3 to the same process as described above, generates the level-specific screen name information and the configuration information, and records the generated information in the GUI information recording section 5. More specifically, the GUI information extraction section 3 extracts "Business System C", which is the text displayed in the window title area (area C21 shown in FIG. 17) of window C-2, as a level 0 screen name, extracts "Request for Business Trip>Result Confirmation", which is the text displayed at the upper left corner of the right-hand frame of window C-2 (area C32), as a level 1 screen name, extracts "Registration Information 1", which is the text in the currently selected tab in the tab group below the text at the level 1 screen name display location, as a level 2 screen name, and records the extracted pieces of text (data descriptions) and the level information about the screen names in the GUI information recording section 5 as the level-specific screen name information. Next, the GUI information extraction section 3 acquires information about components included in an area (area C24) other than the screen name portion in a screen area containing "Registration Information 1", which is the lowest-hierarchical-level screen name in window C-2, converts the acquired information to configuration information, and records the configuration information in the GUI information recording section 5.

Moreover, the GUI information extraction section 3 performs the same operation for window C-3. More specifically, the GUI information extraction section 3 extracts "Business System C", which is the text displayed in the window title area (area C31 shown in FIG. 18), as a level 0 screen name, extracts "Request for Business Trip>Result Confirmation", which is the text displayed at the upper left corner of the right-hand frame of window C-3 (area C32), as a level 1 screen name, extracts "Registration Information 2", which is the text in the currently selected tab in the tab group below the text at the level 1 screen name display location, as a level 2 screen name, and records the extracted pieces of text (data descriptions) and the level information about the screen names in the GUI information recording section 5 as the level-specific screen name information. Next, the GUI information extraction section 3 acquires information about components included in an area (area C34) other than the screen name portion in a screen area containing "Registration Information 2", which is the lowest-hierarchical-level screen name in window C-2, converts the acquired information to configuration information, and records the configuration information in the GUI information recording section 5.

When the GUI information extraction operation is completed by the GUI information extraction section 3, the screen name judgment section 4 references the level-specific screen name information stored in the GUI information recording section 5, and checks whether a plurality of screens have the same screen names at all levels. In the present example, it is found that windows C-2 and C-3 agree with each other in the screen names at all levels (levels 0 to 2). Therefore, the screen name judgment section 4 compares the configuration information between windows C-2 and C-3 to check whether they have different components. In the present example, the configuration information about acquisition target area C23 in window C-2 is compared against the configuration information about acquisition target area C33 in window C-3 to find that windows C-2 and C-3 differ in the data descriptions of text boxes, but agree with each other in the number of components, the type-specific order of component arrangement, and the data description of components other than text boxes arranged in the same order. Thus, the screen name judgment section 4 judges that windows C-2 and C-3 have the same components, finds that these screens are identical with each other although they handle different data, and concludes that there might be a uniqueness problem with the screen names in the compared screens (concludes that the compared screens require attention). Meanwhile, window C-1 disagrees with windows C-2 and C-3 in the screen names at all levels. Therefore, the screen name judgment section 4 concludes that there is no uniqueness problem with the screen names in window C-1.

FIG. 19 shows an output example of a screen name uniqueness judgment result concerning windows C-1, C-2, and C-3, which are the evaluation target screens of business system C. In the example shown in FIG. 19, the level-specific screen names are indicated on an individual level basis, integrated, and specified as screen names in the evaluation target system 6. Further, the identifiers of the associated screens are output after being associated with the presence of a uniqueness problem with the screen names. This makes it possible to understand that there is no uniqueness problem with the presented screen names assigned to window C-1, and that there might be a uniqueness problem with the other screen names, and further that there might be the uniqueness problem with the screen names assigned to windows C-2 and C-3.

As described above, the evaluator can check a target screen, judge whether a user of the evaluation target system can determine whether the name of the screen is appropriate for all possibly problematic screens, that is, whether the screen name fully indicates the operation to be performed from the screen (whether the screen name properly plays its role) when the user references text in a text box (a data description presented by the text box), and recognize the necessity of determining whether there is no problem at present or the screen name needs to be corrected. Further, an evaluation can be made to imply that an initial screen name designation is inadequate (a lower-hierarchical-level screen name needs to be designated). Thus, the evaluator can recognize the necessity of reviewing the designation of the screen name.

FIG. 19 shows an example in which the result of evaluation of each screen name is presented. Alternatively, however, the result of evaluation of each evaluation target screen can be presented. For example, it is assumed, as shown in FIG. 20, when three evaluation target screens (windows 1, 2, and 3) are checked to evaluate the uniqueness of screen names, the three screens are judged to have the same screen name, which is "Screen A" as indicated by the text at level 0 only. It is also assumed that the configuration information about an acquisition target area in window 1 and the configuration information about an acquisition target area in window 2 are judged to be identical with each other as they merely differ in the text box data. Further, it is assumed that the configuration information about an acquisition target area in window 1 and the configuration information about an acquisition target area in window 3 are judged to be different from each other as they differ in the number of components. Furthermore, it is assumed that the configuration information about an acquisition target area in window 2 and the configuration information about an acquisition target area in window 3 are judged to be different from each other as they differ in the number of components.

In the above situation, for example, the screen name of each evaluation target screen may be presented after being associated with related screen information indicative of a problem, as shown in FIG. 21. The example shown in FIG. 21 indicates that window 1 has a screen name of "Screen A", and that the relationship between windows 1 and 2 requires attention, and further that the relationship between windows 1 and 3 is problematic. The example also indicates that window 2 has a screen name of "Screen A", and that the relationship between windows 1 and 2 requires attention, and further that the relationship between windows 2 and 3 is problematic. The example further indicates that window 3 has a screen name of "Screen A", and that the relationship between windows 1 and 3 is problematic, and further that the relationship between windows 2 and 3 is also problematic.

The results described above cause the evaluator to conclude that window 3, which differs in configuration from all the other screens in the same set, needs to be fully corrected. The result pertaining to windows 1 and 2 cause the evaluator to recognize the necessity of checking actual screens and business requirements and determining whether or not the screens have problems and need to be corrected.

As described above, the use of the GUI evaluation system according to the present exemplary embodiment makes it possible to recognize screen names in a screen within the evaluation target system and their hierarchical structure in accordance with screen name locations and levels designated by the evaluator. When the screen names agree with each other, the GUI evaluation system makes it possible to judge whether components in a display area, which is a main area of the associated screens, differ from each other, thereby properly determining whether the screens should be handled as the same screens or different screens. Consequently, the uniqueness of the name of each screen in the evaluation target system can be evaluated easily and accurately.

Particularly, the present exemplary embodiment is also effective even when applied to a system having a screen configuration in which some pieces of text representing a screen name are dispersedly placed within a screen.

In the above example, a set of level-specific screen names is designated for one system. However, when, for instance, the screens within a system differ in the locations of some pieces of text representing a screen name, uniqueness evaluation may be accomplished by designating screen names as needed to cover all screen patterns in which the screen names are disposed, and evaluating the uniqueness of screen names on an individual pattern basis. Alternatively, the screen names may be acquired for each pattern and integrated to evaluate the uniqueness of screen names.

Second Embodiment

Figure 22:
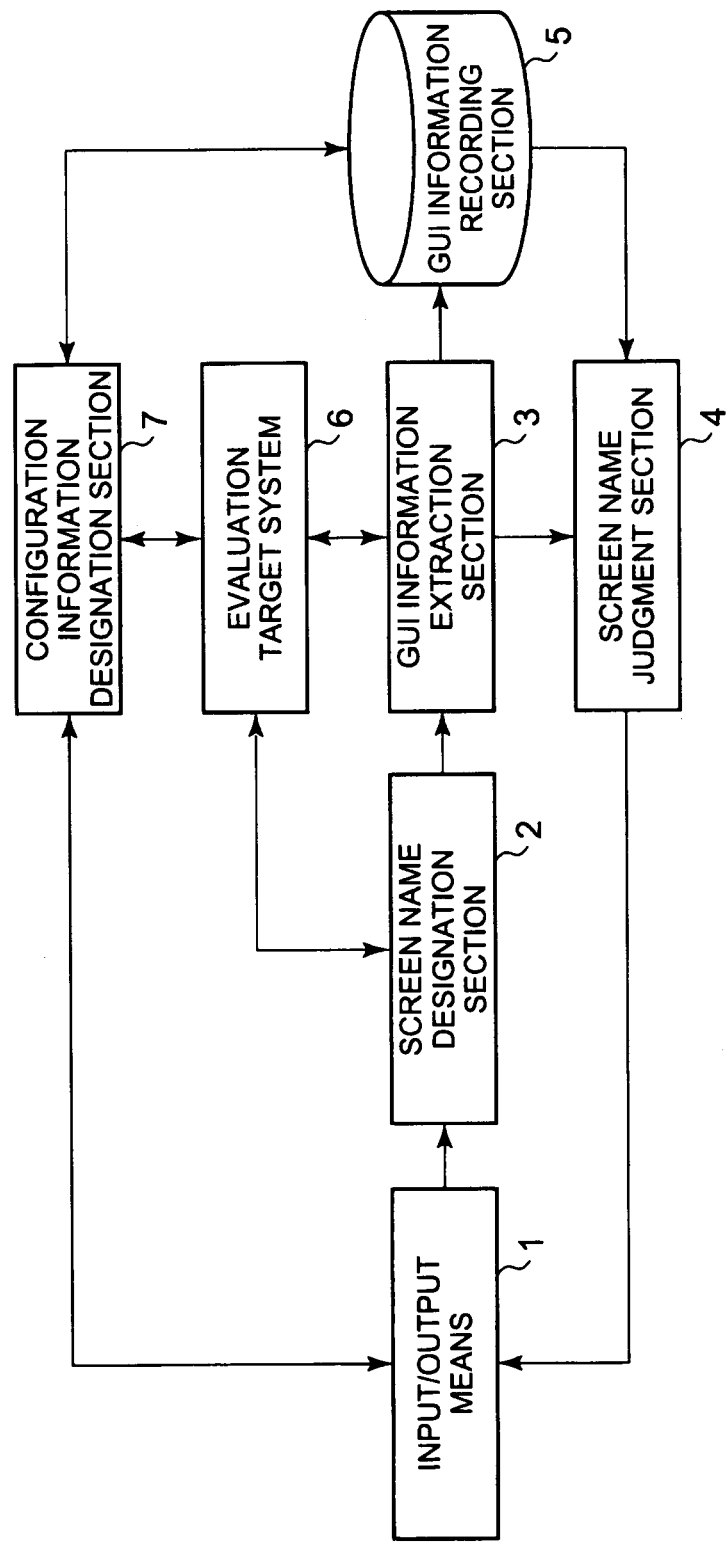
FIG. 22 It depicts a block diagram illustrating an example configuration of the GUI evaluation system according to a second exemplary embodiment of the present invention.

A second exemplary embodiment of the present invention will now be described. FIG. 22 is a block diagram illustrating an example configuration of the GUI evaluation system according to the second exemplary embodiment. The GUI evaluation system shown in FIG. 22 differs from the GUI evaluation system according to the first exemplary embodiment, which is shown in FIG. 3, in that the former includes a configuration information designation section 7. The configuration information designation section 7 is a processing section equivalent to the judgment target designation means 105 shown in FIG. 2.

In accordance with operation information that is input by the operator through the input/output means 1, the configuration information designation section 7 performs a designation operation to specify whether components included in an evaluation target screen of the evaluation target system 6 or the screen output style attributes of the components such as data descriptions, are to be subjected to identity judgment. Here, the term "specify" means to generate information that is indicative of designation and recognizable by the screen name judgment section 4. The designation operation may be performed not only to specify a location on an individual basis, but also to validate or invalidate a roughly defined area, for instance, by invalidating items other than text near a user-inputtable part or invalidating text within a table.

The configuration information designation section 7 may, for example, acquire the information about a displayed screen, make a layout analysis, and specify a relative position in a screen, analyze the structure of an HTML or other structured document and specify an area where a screen name is displayed, and present an option for validating or invalidating a parameter for a displayed part. Alternatively, the configuration information designation section 7 may make an evaluation and then present an option for validating or invalidating the configuration information about a group of screens having the same screen names in accordance with the configuration information generated by the GUI information extraction section 3.

In the present exemplary embodiment, the configuration information designation section 7 is implemented, for instance, by a CPU that operates in accordance with a program.

Figure 23:
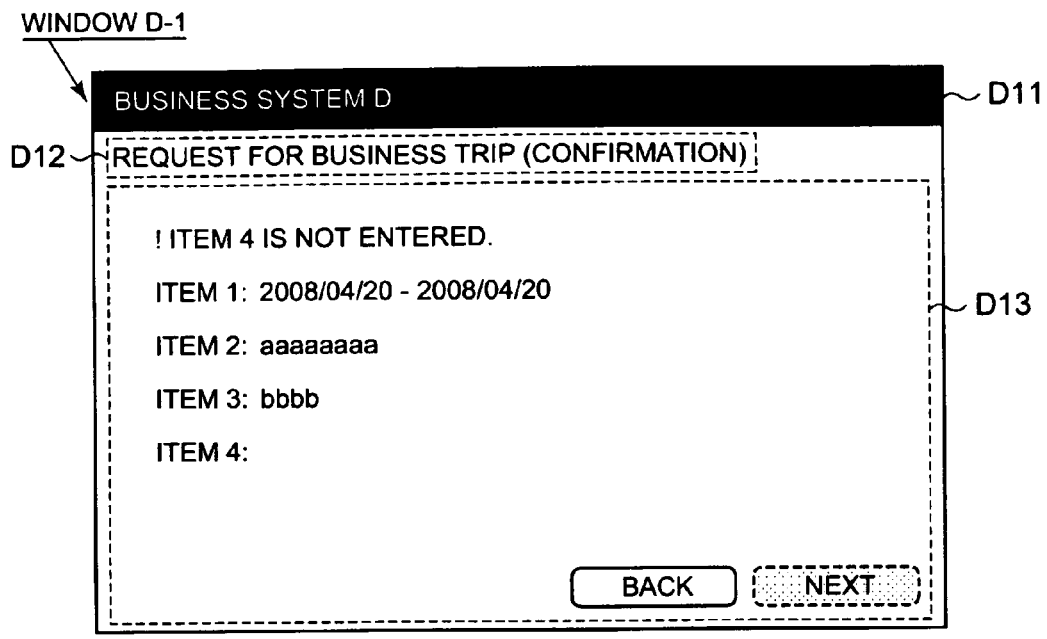
FIG. 23 It depicts a screen example of the evaluation target system 6 (business system D).
Figure 24:
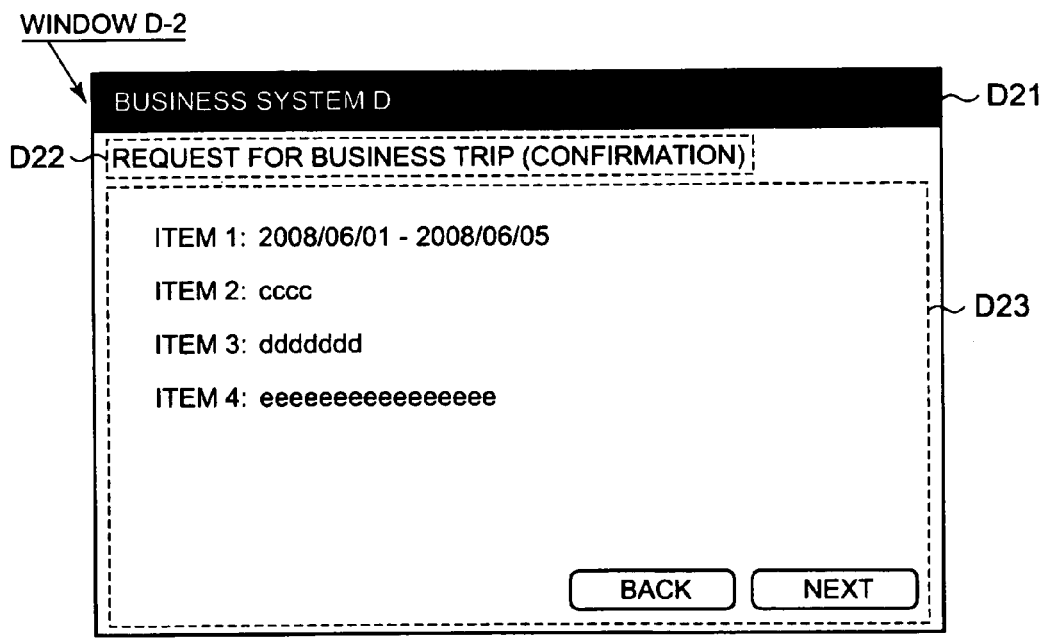
FIG. 24 It depicts a screen example of the evaluation target system 6 (business system D).

For example, as regards window D-1 shown in FIG. 23 and window D-2 shown in FIG. 24, their data cannot be distinguished from their labels because no user-inputtable text input/output part is used for text display. Further, an error message display area is provided for window D-2. Moreover, windows D-1 and D-2 differ in the operability of the "Next" operation button.

Windows D-1 and D-2 are substantially the same screens although they differ in the displayed data due to user operations. In the examples shown in FIGS. 23 and 24, however, the components are judged to be different from each other. Consequently, the result of evaluation indicates that there is a uniqueness problem with the screen names in windows D-1 and D-2.

In the above instance, the evaluator may perform an operation to specify whether or not components included in an evaluation target screen or the attributes of the components such as data descriptions, are to be subjected to identity judgment. FIG. 25 shows an example of identity judgment target designation by the configuration information designation section 7. For example, the evaluator may designate the attribute information about window D-1 that is to be excluded from the comparison for identity judgment, as shown in FIG. 25, thereby allowing the configuration information designation section 7 to edit again the configuration information accordingly. In the example shown in FIG. 25, the portions to be excluded from the comparison for identity judgment are underlined. Here, particular data lines, particular cells, or particular portions of data in the configuration information can be designated. When a particular data line is designated as the portion to be excluded from comparison, it is also excluded from the counting of the number of components.

The screen name judgment section 4 may exclude components or the attributes of the components (or more specifically, the screen output style that may be affected by the attributes) from the comparison for identity judgment in accordance with the designated information, and judge whether a group of screens having the same screen names at all levels differ in the component information. For example, the edited configuration information about window D-1 shown in FIG. 25 and the configuration information about window D-2 shown in FIG. 26 are used first to compare the number of components except the components excluded from the comparison for identity judgment. Here, it is found that windows D-1 and D-2 have the same number of components. Therefore, the types of individual lines except the components excluded from the comparison for identity judgment are sequentially compared in the order of lines in each table. Next, as the types of all the compared lines agree with each other, only a portion of each line that is targeted for comparison is then subjected to comparison. Consequently, it is concluded that windows D-1 and D-2 have the same components.

As described above, even when a precautionary note (guidance message) or a data description is to be displayed by using text, a table, a list, or the like without using a text box or other user-inputtable text input/output part, the present exemplary embodiment makes it possible to properly form an identity judgment of the components. Therefore, the uniqueness of the name of each screen in the evaluation target system can be evaluated with increased accuracy. In the other respects, the present exemplary embodiment is the same as the first exemplary embodiment.

The screen name designation section, GUI information extraction section, screen name judgment section, and GUI information recording section described in connection with the foregoing exemplary embodiments may be implemented as separate units.

The foregoing exemplary embodiments represent characteristic configurations of the GUI evaluation system as described under (1) to (8) below.

(1) The GUI evaluation system includes a GUI information acquisition section (which is implemented, for instance, by the GUI information acquisition means 101 and the GUI information extraction section 3), and a screen name evaluation section (which is implemented, for instance, by the screen name evaluation means 102 and the screen name judgment section 4). The GUI information acquisition section acquires a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names; and acquires information about components used in a contents display area where the contents of the lowest-level screen name existing in the evaluation target screen are displayed as a title. The screen name evaluation section evaluates the uniqueness of screen names in the evaluation target system in accordance with the information about the level-specific screen name in each evaluation target screen, which is acquired by the GUI information acquisition section, and in accordance with the information about the components included in the contents display area of each evaluation target screen.

(2) The GUI evaluation system may further include a screen name designation section (which is implemented, for instance, by the screen name designation means 103 and the screen name designation section 2). The screen name designation section generates, in accordance with a user operation relative to the screen of the evaluation target system, screen name designation information for indicating a screen name display location used to display at least part of information equivalent to a screen name in a screen of the evaluation target system, the screen name designation information being indicated as classified according to a hierarchical level within a hierarchical structure formed by screen names.

(3) When a plurality of evaluation target screens have the same screen names at all levels, the screen name evaluation section in the GUI evaluation system may evaluate the uniqueness of screen names in the evaluation target system by further judging whether the components included in the contents display areas of the evaluation target screens having the same screen names are identical with each other.

(4) When a plurality of evaluation target screens have the same screen names at all levels, the screen name evaluation section in the GUI evaluation system may evaluate the uniqueness of screen names in the evaluation target system by further judging whether the components included in the contents display areas of the evaluation target screens having the same screen names are identical with each other.

(5) When a plurality of evaluation target screens have the same screen names at all levels, and the components included in the contents display areas of the evaluation target screens having the same screen names and subjected to identity judgment differ only in the output text of a user-inputtable text input/output part, the screen name evaluation section may conclude that there might be a uniqueness problem with the screen names.

(6) The GUI evaluation system may further include a judgment target designation section (which is implemented, for instance, by the judgment target designation means 105 and the configuration information designation section 7). In accordance with a user operation, the judgment target designation section specifies whether or not components included in an evaluation target screen of the evaluation target system or the screen output style attributes of the components are to be excluded from identity judgment.

(7) The GUI evaluation system may further include a GUI information recording section (which is implemented, for instance, by the GUI information storage means 104 and the GUI information recording section 5). The GUI information recording section stores GUI information about the evaluation target system. The GUI information is acquired by the GUI information acquisition section and includes information about the level-specific screen name in each evaluation target screen and information about the components included in the contents display area of each evaluation target screen.

(8) The GUI evaluation system includes GUI information acquisition means (which is implemented, for instance, by the GUI information acquisition means 101 and the GUI information extraction section 3) and screen name evaluation means (which is implemented, for instance, by the screen name evaluation means 102 and the screen name judgment section 4). The GUI information acquisition means acquires a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names; and acquires information about components used in a contents display area where the contents of the lowest-level screen name existing in the evaluation target screen are displayed as a title. The screen name evaluation means evaluates the uniqueness of screen names in the evaluation target system in accordance with the information about the level-specific screen name in each evaluation target screen, which is acquired by the GUI information acquisition means, and in accordance with the information about the components included in the contents display area of each evaluation target screen.

While the present invention has been described in terms of preferred exemplary embodiments and examples, it will be understood by those skilled in the art that the invention is not limited to those preferred exemplary embodiments and examples, and that modifications and variations can be made without departing from the spirit and scope of the invention.

This application is based upon and claims the benefit of priority from Japanese patent application No. 2008-251812, filed on Sep. 29, 2008, the disclosure of which is incorporated herein in its entirety by reference.

INDUSTRIAL APPLICABILITY

The present invention is preferably applicable to the evaluation of the usability of a system.

REFERENCE SIGNS LIST

1 Input/output means
2 Screen name designation section
3 GUI information extraction section
4 Screen name judgment section
5 GUI information recording section
6 Evaluation target system
7 Configuration information designation section
200 Evaluation target system
101 GUI information acquisition means
102 Screen name evaluation means
103 Screen name designation means
104 GUI information storage means
105 Judgment target designation means

The invention claimed is:

1. A GUI evaluation system comprising:
a GUI information acquisition section which acquires a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquires information about components used in a contents display area where contents of a lowest-level screen name existing in the evaluation target screen are displayed as a title, the GUI information acquisition section implemented by a processor operating according to a program; and
a screen name evaluation section which evaluates a uniqueness of screen names in the evaluation target system in accordance with information about the level-specific screen name in each evaluation target screen, the level-specific screen name being acquired by the GUI information acquisition section, and in accordance with the information about the components included in the contents display area of each evaluation target screen, the screen name evaluation section implemented by a processor operating according to a program.

2. The GUI evaluation system according to claim 1, further comprising:
a screen name designation section which generates, in accordance with a user operation relative to a screen of an evaluation target system, screen name designation information for indicating a screen name display location used to display at least part of information equivalent to a screen name in a screen of the evaluation target system, the screen name designation section implemented by a processor operating according to a program, the screen name designation information being indicated as classified according to a hierarchical level within a hierarchical structure formed by screen names.

3. The GUI evaluation system according to claim 1, wherein, when a plurality of evaluation target screens have a same screen names at all levels, the screen name evaluation section evaluates the uniqueness of screen names in the evaluation target system by further judging whether the components included in the contents display areas of the evaluation target screens having the same screen names are identical with each other.

4. The GUI evaluation system according to claim 3, wherein, when a plurality of evaluation target screens have the same screen names at all levels, and the components included in the contents display areas of the evaluation target screens having the same screen names and subjected to identity judgment differ at least in the number of included components, in the order of component arrangement, or in the style of screen output other than output text of a user-inputtable text input/output part, the screen name evaluation section concludes that there is a uniqueness problem with the screen names.

5. The GUI evaluation system according to claim 3, wherein, when a plurality of evaluation target screens have the same screen names at all levels, and the components included in the contents display areas of the evaluation target screens having the same screen names and subjected to identity judgment differ only in an output text of a user-inputtable text input/output part, the screen name evaluation section concludes that there might be a uniqueness problem with the screen names.

6. The GUI evaluation system according to claim 3, further comprising:
a judgment target designation section which specifies, in accordance with a user operation, whether or not components included in an evaluation target screen of the evaluation target system or a screen output style attributes of the components are to be excluded from identity judgment, the judgment target designation section implemented by a processor operating according to a program.

7. The GUI evaluation system according to claim 1, further comprising:
a hardware storage m providing a GUI information storage section which stores GUI information about the evaluation target system, the GUI information being acquired by the GUI information acquisition section and including information about the level-specific screen name in each evaluation target screen and information about the components included in the contents display area of each evaluation target screen.

8. The GUI evaluation system according to claim 1, where when no displayed text information exists at a location corresponding to a screen name display location within a screen, said GUI information acquisition section stores information indicating that said location is null.

9. A GUI evaluation method comprising:
acquiring a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquiring information about components used in a contents display area where contents of a lowest-level screen name existing in the evaluation target screen are displayed as a title; and
evaluating a uniqueness of screen names in the evaluation target system in accordance with acquired information about the level-specific screen name in each evaluation target screen and the information about the components included in the contents display area of each evaluation target screen.

10. The GUI evaluation method according to claim 9, further comprising:
generating, in accordance with a user operation relative to a screen of an evaluation target system, screen name designation information for indicating a screen name display location used to display at least part of information equivalent to a screen name in a screen of the evaluation target system, the screen name designation information being indicated as classified according to a hierarchical level within a hierarchical structure formed by screen names.

11. The GUI evaluation method according to claim 9, further comprising:
when a plurality of evaluation target screens have same screen names at all levels, evaluating the uniqueness of screen names in the evaluation target system by further judging whether the components included in the contents display areas of the evaluation target screens having the same screen names are identical with each other.

12. The GUI evaluation method according to claim 11, further comprising:
when a plurality of evaluation target screens have same screen names at all levels, and the components included in the contents display areas of the evaluation target screens having the same screen names and subjected to identity judgment differ at least in a number of included components, in an order of component arrangement, or in a style of screen output other than output text of a user-inputtable text input/output part, concluding that there is a uniqueness problem with the screen names.

13. The GUI evaluation method according to claim 11, further comprising:
when a plurality of evaluation target screens have same screen names at all levels, and the components included in the contents display areas of the evaluation target screens having the same screen names and subjected to identity judgment differ only in an output text of a user-inputtable text input/output part, concluding that there might be a uniqueness problem with the screen names.

14. The GUI evaluation method according to claim 11, further comprising:
specifying, in accordance with a user operation, whether or not components included in an evaluation target screen of the evaluation target system or a screen output style attributes of the components are to be excluded from identity judgment.

15. A non-transitory computer readable information recording medium storing a GUI evaluation program, when executed by a processor, performs a method comprising:
acquiring a screen name that is classified according to a hierarchical level and displayed in an evaluation target screen possessed by an evaluation target system, in accordance with screen name designation information for indicating a screen name display location used to display at least part of information equivalent to a screen name in a screen of the evaluation target system, the screen name designation information being indicated as classified according to a hierarchical level within a hierarchical structure formed by screen names, and acquiring information about components used in a contents display area where contents of a lowest-level screen name existing in the evaluation target screen are displayed as a title; and evaluating a uniqueness of screen names in the evaluation target system in accordance with acquired information about the level-specific screen name in each evaluation target screen and the information about the components included in the contents display area of each evaluation target screen.

16. The non-transitory computer readable information recording medium according to claim 15, the method further comprising:

generating, in accordance with a user operation relative to a screen of the evaluation target system, screen name designation information for indicating a screen name display location used to display at least part of information equivalent to a screen name in a screen of the evaluation target system, the screen name designation information being indicated as classified according to a hierarchical level within a hierarchical structure formed by screen names.

17. The non-transitory computer readable information recording medium according to claim 15, in the screen name evaluation process, making the computer perform, when a plurality of evaluation target screens have same screen names at all levels, evaluating the uniqueness of screen names in the evaluation target system by further judging whether the components included in the contents display areas of the evaluation target screens having the same screen names are identical with each other.

18. The non-transitory computer readable information recording medium according to claim 17, in the screen name evaluation process, making the computer perform, when a plurality of evaluation target screens have same screen names at all levels, and the components included in the contents display areas of the evaluation target screens having the same screen names and subjected to identity judgment differ at least in a number of included components, in an order of component arrangement, or in a style of screen output other than output text of a user-inputtable text input/output part, concluding that there is a uniqueness problem with the screen names.

19. The non-transitory computer readable information recording medium according to claim 17, in the screen name evaluation process, making the computer perform, when the components included in the contents display areas of the evaluation target screens having the same screen names and subjected to identity judgment differ only in an output text of a user-inputtable text input/output part, concluding that there might be a uniqueness problem with the screen names.

20. The non-transitory computer readable information recording medium according to claim 17, the method further comprising:

specifying, in accordance with a user operation, whether or not components included in an evaluation target screen of the evaluation target system or a screen output style attributes of the components are to be excluded from identity judgment.

* * * * *